F. H. RAGAN.
POWER OPERATING DEVICE.
APPLICATION FILED FEB. 9, 1914. RENEWED AUG. 2, 1917.
1,276,811.
Patented Aug. 27, 1918.
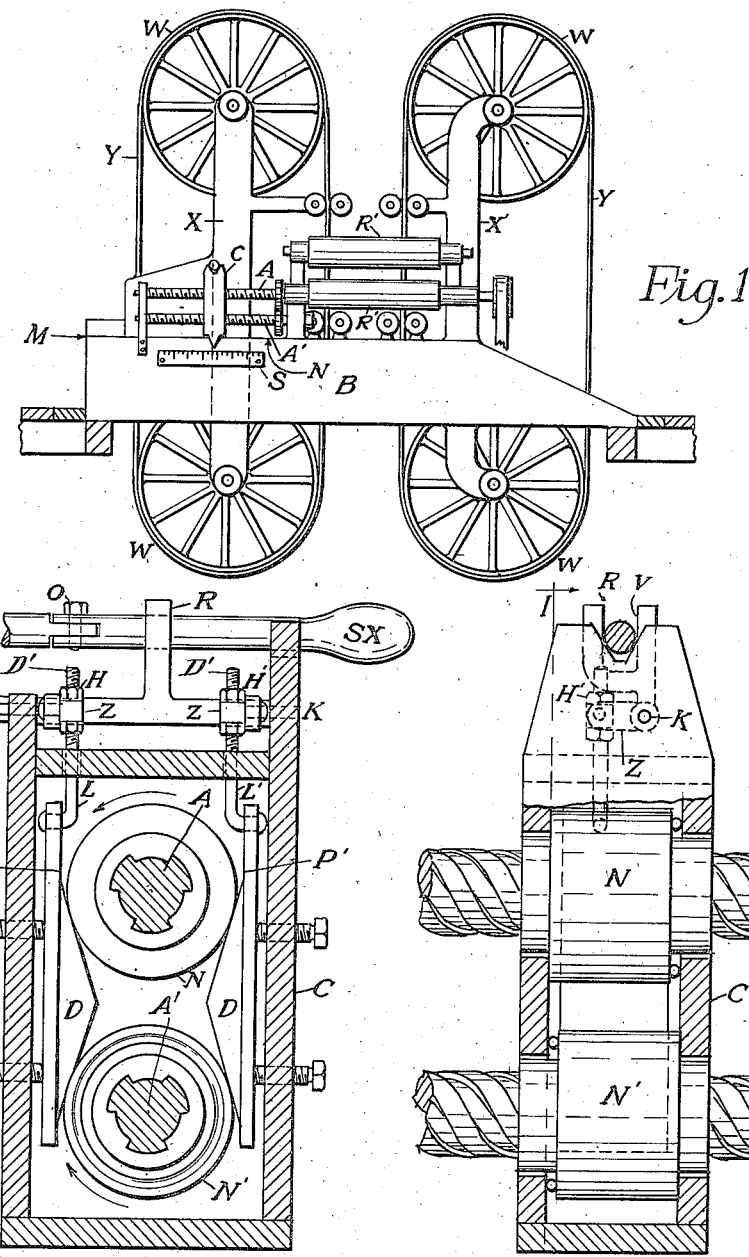

UNITED STATES PATENT OFFICE.

FREDERICK HATHAWAY RAGAN, OF DETROIT, MICHIGAN.

POWER OPERATING DEVICE.

1,276,811. Specification of Letters Patent. Patented Aug. 27, 1918.

Application filed February 9, 1914, Serial No. 817,717. Renewed August 2, 1917. Serial No. 184,173.

*To all whom it may concern:*

Be it known that I, FREDERICK HATHAWAY RAGAN, a citizen of the United States, and formerly a resident of Seattle, King county, Washington, but now of Detroit, Wayne county, Michigan, have invented certain new and useful Improvements in Power Operating Devices, of which the following is a specification.

My invention relates to a power operating device to cause power to be applied automatically at the will of the operator to any mechanism or construction to which it may be applied, and while I have shown my device for applying power to operate one of the members of a band re-saw combination, I have done so in order to give a clear and definite description of my invention and to illustrate one of many embodiments thereof.

Speaking in general terms, my device consists of one or more rotatable shafts, such as screw-shafts, on which is mounted a nut arranged in a casing which is provided with means for arresting or retarding the rotation of the nut or nuts so that the rotation of the shaft or shafts will cause the bodily movement of the casing and nut or nuts longitudinally of the screw shaft or the longitudinal movement of such shafts in case the casing and nut or nuts are held or mounted stationary. The means for arresting or retarding the rotation of the nut operate on the friction principle, which absolutely eliminates any possibility of breakage of any sort as is common in a power device where the action is positive. A maximum amount of power is delivered by the device in either direction to any desired extent. Light pressure on the friction means either by hand or mechanical means, provides a correspondingly small amount of power while heavy pressure produces the full amount of power deliverable by the screw action, depending only upon the size and strength of screws and nuts employed. A friction appliance may be used such as a spring steel band brake around the nuts, which will afford the maximum deterrent force upon said nuts. By the use of a plurality of these screw shafts, a change in direction or reversal of direction of the power may be obtained substantially instantaneously and under the complete control of the operator.

In the drawing Figure 1 is a front elevation of the band re-saw combination, showing application of my power device thereto as one embodiment of my invention; Fig. 2, a sectional elevation of the line 1 of Fig. 3; and Fig. 3 an elevation of the casing, nuts and screw shafts with a portion of the casing broken away to expose said nuts.

Referring to the particular embodiment of my invention as here shown, the two frames X and X' of the band re-saw are provided with wheels upon which the band saws Y travel and by which they are driven. The frame X' is stationary, being suitably fastened to the solid base B. The other frame X is movable, being mounted to slide in suitable guides on the base along the line M—N.

By moving the frame X with its wheels and saw, any desired space is attainable between the saws, the extent of which space is indicated by a scale S. Lumber being fed by the feed rolls R and R' against the band saws is thereby cut to any desired width. Obviously vertical feed rolls may be used in place of the horizontal ones shown.

Referring to my power operating device, and describing the particular installation here shown in which the device is made applicable to a band re-saw, there are two similarly threaded parallel screw shafts A and A' revolving in opposite directions, upon which are screw threaded two cylindrical nuts N and N', with the result that these nuts are capable of longitudinal movement of the shafts and also rotary movement therewith. These nuts are inclosed in a suitable casing C, which in the instance being described is fastened to or incorporated with the movable frame, so that the latter will partake of the movements of the casing and nuts longitudinally with respect to the screw shafts.

The means for arresting or retarding the rotation of the nut or nuts within the casing consists, as shown, of a friction device in the form of two friction wedges DD, working vertically between the two nuts. These wedges are secured to members P and P' to the upper ends of which are attached the rods L and L', extending upwardly outside the casing where they are connected to the short lever arms Z by pivotal connection therewith. These lever arms in turn connect with the transverse lever R at its opposite ends and from the center of this lever rises a bifurcated arm R, V, within which is disposed the operating handle SX of the band re-saw frame. Means are provided for adjusting the wedges DD toward and from the nuts N, N' for taking up wear and to permit the wedges to take effect with a minimum of movement of the lever or handle SX. As shown in the drawings each of the wedges is adjustable by means of two set screws D' which are fitted to threaded openings in the casing C and which may obviously be used to guide the wedges D and to adjust them with respect to the two nuts so that a slight movement of the handle SX one way or the other will cause the wedges to bear frictionally upon one or the other of the nuts N, N'.

Describing the operation, if the saw frame is to be shifted to the right, pressure upon the handle (which is pivoted at O) rocks the fork in the same direction. This action rocks the arms Z and raises the wedges D so as to exert frictional resistance upon the nut N. As the screw has a right-hand thread and turns to the right, it immediately begins to work through the retarded or stationary nut N, thereby drawing the casing and frame of the band re-saw to the right. While this action is occurring, the other nut N' is being forced against one side of the casing. To decrease the friction thereat ball bearings are inserted on the thrust side of each nut as shown in Fig. 3. If the saw frame is to be shifted to the left, the operation is the same except that the hand lever is moved to the left, which causes the wedge to engage the lower nut N'. The other nut N being free to rotate with its screw shaft, the band saw frame is drawn to the left by the arresting or retarding of the nut N'.

By the use of the friction means for arresting or retarding the rotary movement of the nut or nuts, it is impossible to break or jam any mechanism to which the device may be applied, inasmuch as the nuts would be permitted to slip before any breakage of mechanism would occur.

Although the particular installation requires a plurality of screw shafts and nuts for positive movement of the saw frame in two directions, it will be understood that my invention in its broader aspect does not require such plurality, that is, where positive movement is desired in one direction only. Also it is obvious that the casing may be the stationary member and the screw shafts the movable member, instead of the reverse, as illustrated.

I claim:

1. In a device of the class described, the combination of a screw shaft, a member screw threaded thereon for rotary movement therewith and longitudinal movement relatively thereto, a casing within which the member is contained, and means for retarding or arresting the movement of such member relative to the screw shaft at the will of the operator.

2. In a device of the class described, the combination of two rotatable screw shafts, a member screw threaded on each shaft for rotary movement therewith and longitudinal movement thereon, means for rotating the shafts in opposite directions, and means arranged to coöperate alternately with the peripheries of said members for retarding or arresting their rotary movement, for the purpose set forth.

3. In a device of the class described, the combination of two rotatable screw shafts, a member screw threaded on each shaft for rotary movement therewith and longitudinal movement thereof, and means coöperating with the periphery of said members for applying varying degrees of friction to the members for retarding or arresting the movement thereof relative to the screw shafts, said shafts being adapted to move the said members in opposite directions.

4. In a device of the class described, the combination of two rotatable screw shafts, a threaded nut on each shaft for rotary movement therewith and longitudinal movement relatively thereto, a casing through which the shafts pass and within which the nuts are contained, means for rotating the shafts in opposite directions, and means for engaging the nuts alternately for retarding or arresting their movement.

5. In a device of the class described, the combination of a rotatable screw shaft, a member screw threaded thereon for rotary movement therewith and longitudinal movement with respect thereto, a casing within which the member is contained, and means for applying a frictional resistance to such member for retarding or arresting its rotary movement.

6. In a device of the class described, the combination of a rotatable screw shaft, a member screw threaded thereon for rotary movement therewith and longitudinal movement with respect thereto, a casing within which the member is contained, means mounted on the casing and coöperating with said member for imparting thereto a frictional resistance.

7. In a device of the class described, the combination of a rotatable screw shaft, a nut screw threaded thereon, a casing within which the nut is contained, and means for applying a frictional resistance to the nut for retarding or arresting its rotary movement.

8. In a device of the class described, the combination of a rotatable screw shaft, a member screw threaded thereon for rotary movement therewith and longitudinal movement with respect thereto, a casing inclosing said member which has end bearings journaled in the casing, and means for applying a frictional resistance to such member for retarding or arresting its rotary movement.

9. In a device of the class described, the combination of a rotatable screw shaft, a nut screw threaded thereon, a casing within which the nut is contained, such nut having end bearings journaled in the casing, and means for applying a frictional resistance to the nut for retarding or arresting its rotary movement.

10. In a device of the class described, the combination of a rotatable screw shaft, a nut screw threaded thereon, a casing within which the nut is contained, mechanism for applying a frictional resistance to the nut for retarding or arresting its rotary movement, and means for holding said mechanism in a neutral position out of frictional contact with the nut.

11. The combination of a rotatable screw shaft, a nut screw threaded thereon for rotary movement therewith and longitudinal movement thereon, a casing inclosing said nut and movable therewith longitudinally of the shaft, and means for applying a frictional resistance to the nut for retarding or arresting its rotary movement.

12. The combination of a pair of rotatable screw shafts, nuts freely carried thereby, and friction devices adapted to coöperate with said nuts for applying frictional resistance thereto for retarding or arresting their rotary movement.

13. The combination of a pair of rotatable screw shafts, nuts freely carried thereby, a friction device adapted to coöperate with said nuts for applying frictional resistance thereto for retarding or arresting their rotary movement, and a casing inclosing said nuts and friction device.

14. The combination of a pair of rotatable screw shafts, nuts freely carried thereby, oppositely arranged friction members coöperating with said nuts for applying frictional resistance thereto for retarding or arresting their rotary movement.

15. The combination of a pair of rotatable screw shafts, nuts freely carried thereby, a friction device adapted to coöperate with said nuts for applying frictional resistance thereto for retarding or arresting their rotary movement, a casing inclosing said nuts and friction device, and means mounted on the casing for operating said friction device.

16. A device of the class described comprising in combination, a pair of screw shafts adapted to be continuously rotated, nuts freely carried by said screw shafts, oppositely located friction members disposed intermediate said nuts and adapted to bear thereagainst, leverage means connecting said friction members, a casing disposed around said nuts and serving as a support for said leverage means, a handle adapted to engage said leverage means, whereby lateral pressure applied to said handle will be transmitted through said leverage means to one of said friction members thereby causing said member to frictionally engage one of said nuts and arrest its free rotative movement with said screw shaft thereby longitudinally shifting said handle in the direction in which the pressure is applied.

17. A device of the class described comprising in combination, a pair of screw shafts adapted to be continuously rotated, cylindrical nuts carried by said screw shafts and adapted to revolve freely therewith, oppositely located friction members disposed intermediate said cylindrical nuts, a casing disposed around said friction members and serving as a support for the same, a lever, links operatively connected to said friction members and having pivot connection with said lever, said lever being pivoted to said casing and having an upwardly projecting U-shaped arm, a lever having a handle adapted to repose in said U-shaped arm, and means whereby said last named lever may retain said friction members in a neutral position out of contact with said cylindrical nuts.

18. A device of the class described comprising in combination a pair of screw shafts adapted to be continuously rotated, cylindrical nuts freely carried thereby, said screws passing through said nuts, oppositely located vertical friction wedges having convergently inclined faces disposed intermediate said nuts, a casing disposed around said friction wedges and serving as a support therefor and thrust bearings for said nuts, a lever, upwardly projecting rods rigidly connected to said friction wedges and adapted to be pivotally adjusted to said lever, said lever pivotally attached to said casing and having an upwardly projecting U shaped arm, a lever having a handle adapted to be reposed in said U shaped arm, said casing being provided with a notch in the same plane as said U shaped arm whereby the handle of said last named lever may retain said friction wedges in a neutral position out of contact with said cylindrical nuts.

19. In a device of the class described, the combination of a rotatable screw shaft, a nut screw threaded thereon, a casing within which the nut is contained, means for applying a frictional resistance to the nut for retarding or arresting its rotary movement, and devices for adjusting said frictional means with respect to the casing and the nut threaded on said screw.

20. The combination of a pair of rotatable screw shafts, nuts freely carried thereby, oppositely arranged friction members coöperating with said nuts for applying frictional resistance thereto for retarding or arresting their rotary movement, manually operated means for moving said friction members to apply frictional resistance to said nuts, and means for adjusting the friction members toward and away from said nuts.

21. The combination of a pair of rotatable screw shafts, nuts freely carried thereby, a friction device adapted to coöperate with said nuts for applying frictional resistance thereto for retarding or arresting their rotary movement, a casing inclosing said nuts and friction device, and a screw threaded in the casing and arranged to adjust the friction device toward and from said nuts.

22. The combination of a pair of rotatable screw shafts, nuts freely carried thereby, a friction device adapted to coöperate with said nuts for applying frictional resistance thereto for retarding or arresting their rotary movement, a casing inclosing said nuts and friction device, and two set screws threaded in the casing and adapted to adjust the friction device toward said nuts.

23. The combination of a pair of rotatable screw shafts, nuts freely carried thereby, a friction device adapted to coöperate with said nuts for applying frictional resistance thereto for retarding or arresting their rotary movement, a casing inclosing said nuts and friction device, said friction device comprising two wedge surfaces one adapted to coöperate with each of said nuts, means for operating the friction device to apply frictional resistance to the rotation of said nuts, and means for adjusting the friction device toward and from said nuts.

24. In a device of the class described, the combination of two rotatable screw shafts, nuts freely carried thereby, casings in which said nuts have end bearings, devices for frictionally engaging said nuts, means for operating said devices to engage one or the other of the nuts as described, and set screws mounted in the casing and abutting said friction devices, the said friction devices comprising wedges tapered from a central point toward the ends thereof to provide inclined surfaces for engagement with the nuts.

Signed by me at Seattle, Washington, this 2nd day of February, 1914.

FREDERICK HATHAWAY RAGAN.

Witnesses:
ROY VAN MAREN,
R. E. THOMPSON, JR.